(12) United States Patent
Khoury

(10) Patent No.: US 10,472,144 B2
(45) Date of Patent: Nov. 12, 2019

(54) CLOSURE DEVICE

(71) Applicant: Newlight Capital, LLC, Cary, NC (US)

(72) Inventor: Issam Adib Khoury, Rancho Santa Fe, CA (US)

(73) Assignee: Newlight Capital, LLC, Cary, NC (US)

( * ) Notice: Subject to any disclaimer, the term of this patent is extended or adjusted under 35 U.S.C. 154(b) by 377 days.

(21) Appl. No.: 15/342,654

(22) Filed: Nov. 3, 2016

(65) Prior Publication Data

US 2018/0118429 A1 May 3, 2018

(51) Int. Cl.
*B65D 51/28* (2006.01)
*F16K 31/00* (2006.01)
*H01L 41/09* (2006.01)

(52) U.S. Cl.
CPC ........ *B65D 51/2892* (2013.01); *F16K 31/004* (2013.01)

(58) Field of Classification Search
CPC .......................... B65D 51/2892; F16K 3/1004
(Continued)

(56) References Cited

U.S. PATENT DOCUMENTS 2,023,267 A * 12/1935 De Saint Rapt ..... A62B 18/086
128/202.15
4,093,883 A * 6/1978 Yamamoto ............. H01H 57/00
200/181

(Continued)

FOREIGN PATENT DOCUMENTS

JP 2016-89491 A * 5/2016 ............... E04H 9/16

OTHER PUBLICATIONS

Santos, E.C., Santo, R.M., Pedrelli, D.C., Aires, J., Ramalho, T.C., Mota, G.V., & Neto, A.M., Study of the behavior of polyvinylidene fluoride (PVDF) under the action of electric field using semi-empirical methods (PM3). (Apr. 2012) RW&PQJ, vol. 1, No. 10. pp. 1544-1546.

(Continued)

*Primary Examiner* — Thomas M Dougherty
(74) *Attorney, Agent, or Firm* — Mark E. Ungerman, Esq.; Ungerman IP PLLC

(57) ABSTRACT

A closure device may be formed with a reservoir closure housing, defining a reservoir. An electrically-actuated valve may be arranged to open a passage from a reservoir of the closure housing. An actuation circuit may be connected to the electrically-actuated valve. The actuation circuit may include a battery or a power source. The actuation circuit may include a switch connected in series with the power source. The switch may be a manually-actuated switch. The manually-actuated switch may be a twist-actuated switch. The closure device may have a photovoltaic element as a power source. A removable cover may shield the photovoltaic element from light. The closure device may have an electrically-actuated valve that is a piezoelectric electric valve. The closure device wherein the piezoelectric valve may be arranged for fluid communication between a reservoir side of the valve and a container side of said valve and a control member may be movable between a first position blocking said port and a second position, at least partially unblocking the port.

17 Claims, 6 Drawing Sheets

(58) Field of Classification Search
USPC .......................................................... 310/328
See application file for complete search history.

(56) References Cited

U.S. PATENT DOCUMENTS

| | | | | |
|---|---|---|---|---|
| 5,597,019 A | * | 1/1997 | Thomas | B65D 1/0223 |
| | | | | 141/104 |
| 6,561,232 B1 | | 5/2003 | Frutin | |
| 6,685,064 B2 | | 2/2004 | Frutin | |
| 6,843,368 B1 | | 1/2005 | Frutin | |
| 6,918,516 B2 | | 7/2005 | Frutin | |
| 7,298,067 B1 | * | 11/2007 | Kosinski | H03H 9/1014 |
| | | | | 310/313 R |
| 2006/0255064 A1 | * | 11/2006 | Donaldson | A61M 5/142 |
| | | | | 222/95 |
| 2010/0108038 A1 | * | 5/2010 | Kang | F02M 21/0209 |
| | | | | 123/529 |
| 2011/0036425 A1 | * | 2/2011 | Martinello | G05D 16/2066 |
| | | | | 137/557 |
| 2012/0160874 A1 | * | 6/2012 | De Rosa | B05B 9/0861 |
| | | | | 222/333 |
| 2015/0238961 A1 | * | 8/2015 | Vrouwe | F16K 99/0042 |
| | | | | 204/453 |

OTHER PUBLICATIONS

Wirtl, H. & Sixt, U., White paper—Piezo technology in pneumatic valves. (2014) Festo AG & Co. K. G., Germany.
Stoney, S., Industry Viewpoint—Look out solenoid valves . . . Piezoelectric offerings offer much. (Aug. 2, 2012). Medical Design. Retrieved from http://medicaldesign.com/components/industry-viewpoint-look-out-solenoid-valves-piezoelectric-offer-much.

* cited by examiner

CLOSURE DEVICE

BACKGROUND OF THE INVENTION

The invention relates to a closure device, and particularly to a closure device which stores and can introduce an additive into a container.

DESCRIPTION OF THE RELATED TECHNOLOGY

U.S. Pat. No. 6,843,368 B1 entitled, "DEVICE FOR INTRODUCING A PREDETERMINED DOSE OF ADDITIVE INTO A PACKAGED LIQUID" is expressly incorporated by reference herein and shows an apparatus for introducing an additive material in the form of a liquid or granulated solid into a liquid stored in a first container. The additive component is stored separately from the liquid in a dip tube or conduit. The dip tube is a resilient hollow tubular member and has a valve at one end, adapted to open when the dip tube is subject to internal pressure to allow the passage of said additive material therethrough.

U.S. Pat. No. 6,561,232 B1 entitled, "BOTTLE CLOSURE HAVING MEANS FOR MIXING A PREDETERMINED DOSE OF AN ADDITIVE INTO A LIQUID" is expressly incorporated by reference herein and shows an apparatus for introducing an additive component in the form of a liquid or granulated solid into a liquid stored in a first container. The additive component is stored separately from the liquid in a dip tube or conduit. The container has an opening closed by a releasable closure. A second container or tank containing pressurized propellant fluid is positioned in the neck or closure of the first container, adjacent to the opening.

U.S. Pat. No. 5,980,959 B1 entitled, "METHODS AND APPARATUS FOR ENHANCING BEVERAGES" is expressly incorporated by reference herein and shows enhancing the foam head on a bottled beverage where a pressurized container is housed within the neck of the bottle and above the level of the liquid and so arranged that upon opening of the bottle the pressurized container also opens to release the liquid stream therefrom initially to float on the top surface of the beverage in the bottle.

U.S. Pat. Nos. 6,843,368 B1, 6,561,232 B1, and 5,980,959 B1 each show closure devices with mechanically actuated valves. Drawbacks of mechanically actuated valves include complexity of manufacturing, assembly and use.

SUMMARY OF THE INVENTION

There is a benefit to using an electrically-actuated valve in a closure device to reduce the complexity of manufacturing, assembly and use. Electrically-actuated valves may be implemented using fewer parts and may operate more consistently than mechanically actuated valves in closure devices.

A closure device may be formed with a reservoir closure housing, defining a reservoir. An electrically-actuated valve may be arranged to open a passage from a reservoir of the closure housing. An actuation circuit may be connected to the electrically-actuated valve. The actuation circuit may include a battery or a power source. The actuation circuit may include a switch connected in series with the power source. The switch may be a manually-actuated switch. The manually-actuated switch may be a twist-actuated switch. The closure device may have a photovoltaic element as a power source. A removable cover may shield the photovoltaic element from light. The closure device may have an electrically-actuated valve that is a piezoelectric electric valve. The closure device wherein the piezoelectric valve may be arranged for fluid communication between a reservoir side of the valve and a container side of said valve and a control member may be movable between a first position blocking said port and a second position, at least partially unblocking the port.

The closure device may have a first perforated member having one or more openings. The second perforated member may be movable between a first position that blocks the one or more openings in the first perforated member and a second position that at least partially opens at least one opening in said perforated member. One or both of the perforated members may be piezoelectric material. The actuation circuit may include a two-action switch. The closure device may include a tamper evident feature. The closure device may have a flexible membrane located and separating the reservoir into two or more chambers.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
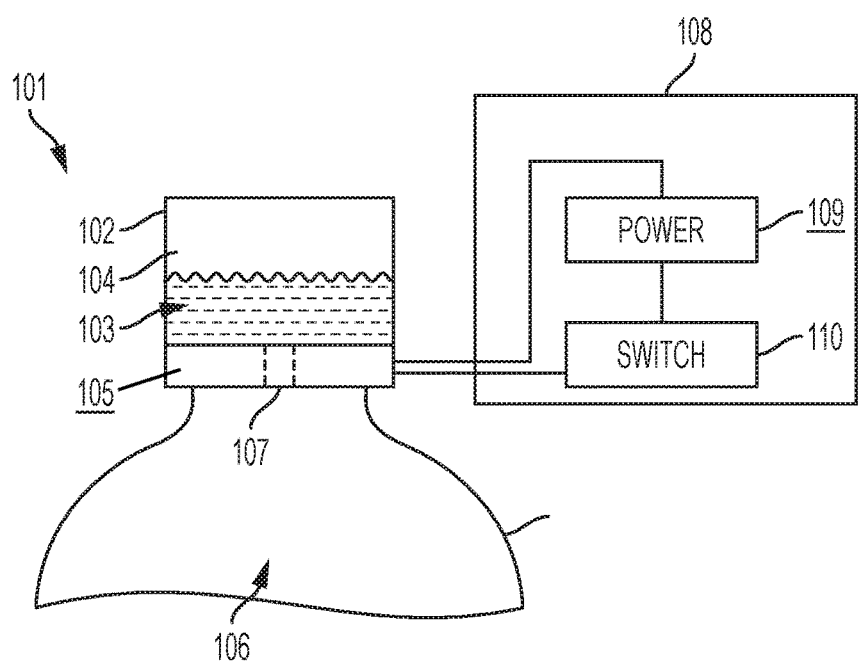
FIG. 1 shows a schematic of a closure device.

FIG. 1 shows a schematic of a closure device 101. The closure device 101 is configured with a compartment 102. The compartment is sized to contain an additive 103 and a propellant 104. The additive 103 may be a liquid and the propellant 104 may be an inert gas. The propellant 104 should at least be inert with respect to the additive and the material of the closure device. An electrically-actuated valve 105 may be provided between the additive 103 and the interior of the container 106. The valve may have a port or a passageway 107. The valve may be binary (open or closed) or variable. The closure device has an actuation circuit 108 which, when activated, provides electricity to the electrically-actuated valve 105.

The actuation circuit may be a power supply such as a battery 109 in series with a switch 110. The switch 110 may be manually actuated. The manually-actuated switch may be triggered by a twisting motion such as is used when opening or closing a bottle cap.

The manually-actuated switch may require two or more actions for actuation. Requirement for two or more actions is used to reduce accidental activation of the valve. In addition the two or more actions may provide a tamper-evident feature.

Figure 2:
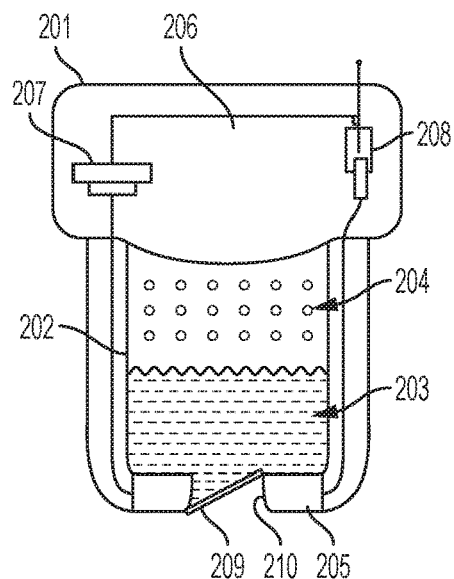
FIG. 2 shows a closure device with a closed reservoir valve.
Figure 3:
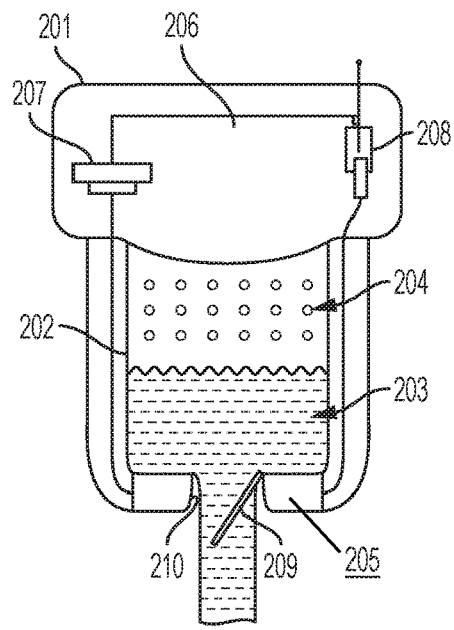
FIG. 3 shows a closure device with an open reservoir valve.
Figure 4:
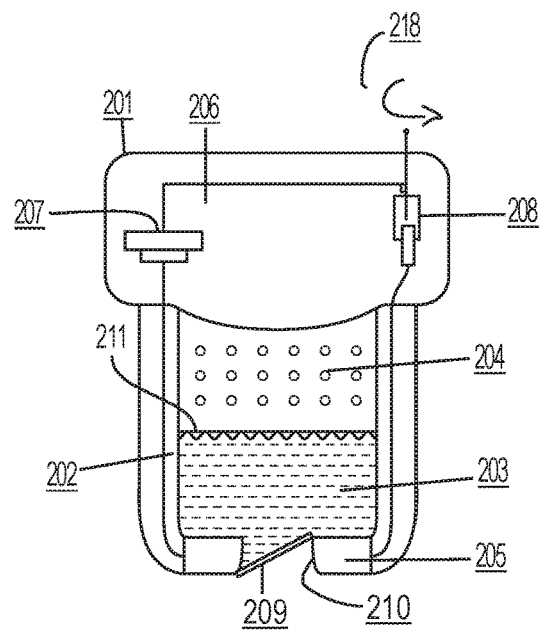
FIG. 4 shows a closure device with a closed reservoir valve and a reservoir membrane to contain at least a portion of propellant in the reservoir.
Figure 5:
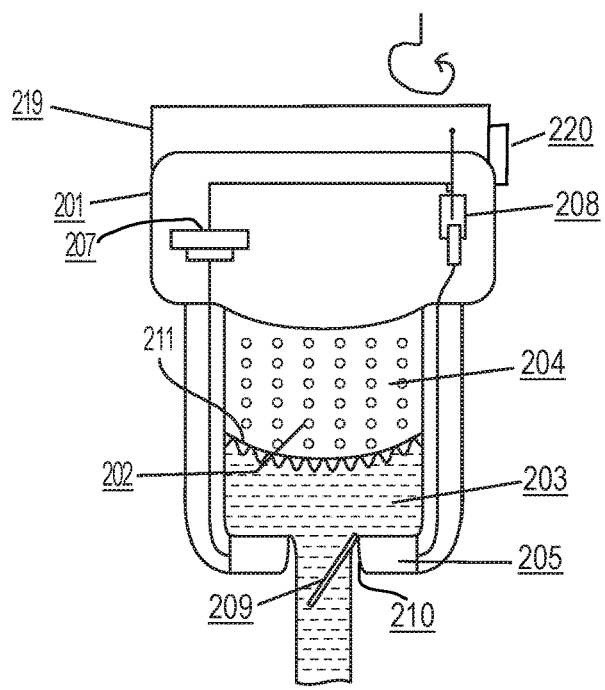
FIG. 5 shows a closure device with an open reservoir valve and a reservoir membrane to contain at least a portion of propellant in the reservoir.

FIG. 2 shows a closure device 201 with a closed reservoir valve. FIG. 3 shows a closure device 201 with an open reservoir valve. The closure device 201 may have a compartment 202 which includes an active product 203 as an additive and an inert gas 204 as a propellant. Advantageously the compartment 202 is under a greater pressure than the container that is being closed. The closure device may be provided with an electrically-actuated valve 205 and an electrical actuation circuit 206. The electrical actuation circuit may include a power source such as a battery 207 and a switch 208. The switch 208 may be twist actuated by turning the extension as indicated by directional arrow 218. The valve closure 209 is shown in the closed position in FIG. 2 and in the open position in FIG. 3. When the valve closure 209 is in the open position, the positive pressure provided by the inert gas 204 forces the additive 203 out of the compartment 202 through a valve port 210. The orientation of the closure device must be such that the additive 203 is between the inert gas 204 and the valve port 210 in order for the pressurized inert gas to effectively push the additive 203 through the port 210 when the valve closure 209 of the valve 205 is in the open position. The effect of orientation may be eliminated by providing a flexible membrane 211, shown in FIGS. 4 and 5. The flexible membrane is positioned to separate the propellant 204 from the additive 203 so as to eliminate the influence of orientation. FIG. 4 shows a closure device 201 with a valve 205 in the closed position with a membrane 211. FIG. 5 shows the closure device 201 in an open position as the additive 203 is being dispensed. The closure device may be provided with a removable cup 219. The switch 208 may be a two-action switch which requires that it be depressed and twisted to be activated. The device may include a tamper-evident feature 220 in the form of a tag on the lid of the housing. All of the elements in FIGS. 4 and 5 which correspond to elements in FIGS. 2 and 3 are given the same references numbers.

Figure 6:
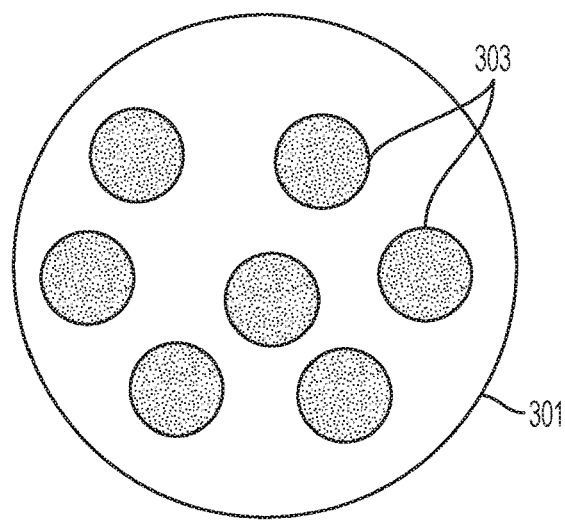
FIG. 6 shows a first perforated membrane for use in a piezoelectric valve.
Figure 7:
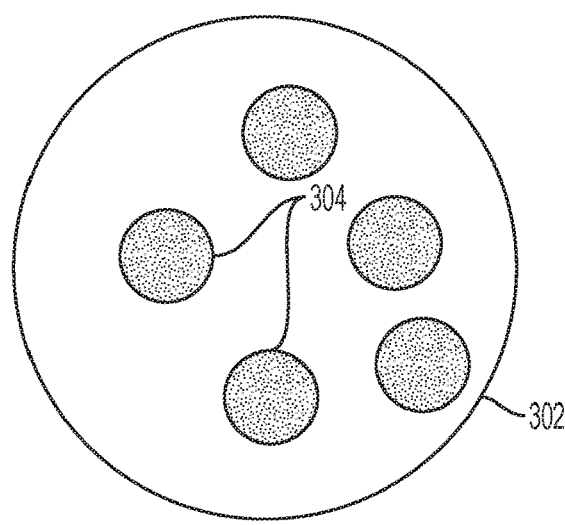
FIG. 7 shows a second perforated membrane for use in a piezoelectric valve.

The electrically-actuated valve may be a piezoelectric valve. Piezoelectric materials tend to contract when a voltage is applied. The piezoelectric valve may be comprised of two perforated membranes 301 and 302, as shown in FIGS. 6 and 7. Perforated membrane 301 may be provided with one or more openings 303. Perforated membrane 302 may also be provided with one or more openings 304. When assembled in the valve the perforated membrane 302 is or may be stacked on perforated membrane 301 in an orientation where none of the openings 303 overlap any of the openings 304. At least one of the perforated membranes may be connected to or comprised of a piezoelectric material and configured so that when current is applied to piezoelectric material, the deformation of one or more membranes will cause alignment of one or more perforations on the respective membranes. The aligned condition defines a port or passage for the additive to be forced by the propellant into a container.

Figure 8:
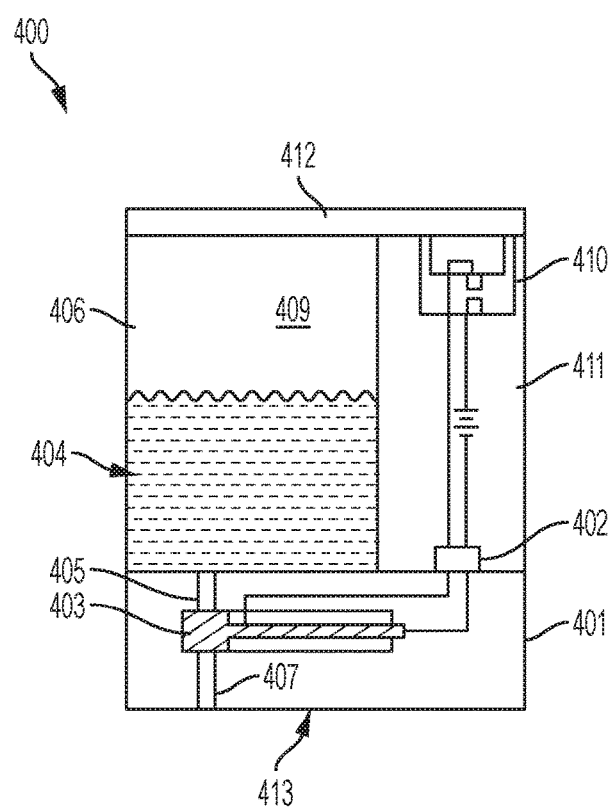
FIG. 8 shows an alternative configuration of an electrically-actuated reservoir closure device with a piezoelectric valve.

FIG. 8 shows an alternative configuration of an electrically-actuated reservoir closure device 400 with a piezoelectric valve 401. The valve 401 may have an electrical connection 402 which may provide an electrical signal to one or more control slides 403. The control slide 403 may be made of or linked to a piezoelectric material. When electricity is applied to the piezoelectric material, the material contracts, the control slide 403 is moved, port 405 is opened, and fluid communication is established between port 405 and passage 407. When fluid communication is established additive 404 is allowed, under the force of propellant 406, to flow from the reservoir 409, through port 405, past slide 403, and through passage 407 into the container (not shown in FIG. 8). The closure device may be intended to seal an opening in a container and may be attached to a container below the closure end 413. A switch 410 may be provided in series with a power source 411. The power source 411 may be a battery. The switch 410 may be a membrane switch. The closure device may be provided with a two action switch to reduce the probability of accidental actuation.

The two action switch may be a membrane switch in combination with a snap-off cover 412. The snap-off cover 412 may be connected to the closure device by a hinge or flexible element. The snap-off cover and/or matching portion of the closure device may include a mechanically-deformable latch arrangement so that the cover may be removed under upward mechanical force. A lip may be provided for facilitating the application of force to the cover. Other two action or interlock switches may be used. For example a push and twist element, like in a childproof cap may be used. Alternatively a removable band may mechanically block depression of a push button or membrane switch until removed. The cover may include a tamper evident feature, for example a tamper evident band, tab, or tag.

Figure 9:
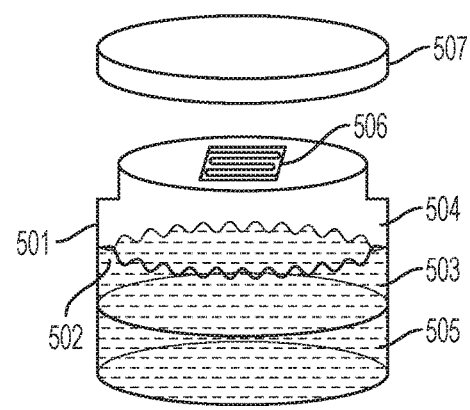
FIG. 9 shows a reservoir closure device with a photoelectric actuation circuit.

FIG. 9 shows a reservoir closure device 501 with a photoelectric actuation circuit. The closure device 501 may have a reservoir 502 containing an additive 503 and a propellant 504. The closure device 501 may have an electrically-actuated valve 505. The device may have a photovoltaic element 506 and a cover 507 which acts as a barrier to any light hitting the photovoltaic element 506. The barrier 507 may be removed in order to expose the photovoltaic element 506 to light whereupon the photovoltaic element 506 generates electricity and provides an electrical signal to the electrically-actuated valve 505, thereby opening the valve and releasing the additive 503 under the force of the propellant 504.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific closure device apparatus and methods have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A closure device comprising:
a reservoir closure housing configured to close a container separate from said reservoir closure housing, wherein said reservoir closure housing defines a reservoir;
an electrically-actuated valve closing said reservoir wherein actuation of said electrically-activated valve operates to open said valve and wherein said valve has a valve port positioned to open a portion of said closure housing configured to lead to an interior of said container; and
an actuation circuit connected to said electrically-actuated valve.

2. A closure device according to claim 1 wherein said actuation circuit comprises a power source.

3. A closure device according to claim 2 wherein said actuation circuit further comprises a switch connected in series with said power source.

4. A closure device according to claim 3 wherein said switch comprises a manually-actuated switch.

5. A closure device according to claim 4 wherein said manually-actuated switch is a twist-actuated switch.

6. A closure device according to claim 2 wherein said power source is a photovoltaic element further comprising a removable cover shielding said photovoltaic element from light.

7. A closure device according to claim 2 wherein said electrically-actuated valve is a piezoelectric electric valve.

8. A closure device according to claim 7 wherein said piezoelectric valve comprises a port arranged for fluid communication between a said reservoir side of said valve and a container side of said valve and a control member movable between a first position blocking said port and a second position, at least partially unblocking said port.

9. A closure device according to claim 8 wherein said port compromises a first perforated member having one or more openings and a second perforated member having at least one opening and wherein said second perforated member is movable between a first position that blocks said one or more openings in said first perforated member and a second position that at least partially opens at least one opening in said first perforated member.

10. A closure device according to claim 9 wherein said first perforated member comprises a piezoelectric material.

11. A closure device according to claim 2, wherein said actuation circuit further comprises a two action switch.

12. A closure device according to claim 11 further comprising a tamper evident feature on said closure device.

13. A closure device according to claim 2, further comprising a tamper evident feature on said closure device.

14. A closure device according to claim 2 wherein said actuation circuit further comprises a switch connected in series with said power source.

15. A closure device according to claim 1, further comprising an additive located in said reservoir and a propellant located in said reservoir.

16. A closure device comprising:
a reservoir closure housing;
an electrically-actuated valve closing a reservoir of said reservoir closure housing;
an actuation circuit connected to said electrically-actuated valve;
an additive located in said reservoir and a propellant located in said reservoir; and
a flexible membrane located in said reservoir, wherein said flexible membrane separates at least a portion of said propellant from at least a portion of said additive.

17. A closure device according to claim 1 further comprising a flexible membrane located in said reservoir, wherein said flexible membrane separates said reservoir into at least two chambers.

* * * * *